United States Patent
Papadopoulos et al.

(10) Patent No.: US 9,240,669 B2
(45) Date of Patent: Jan. 19, 2016

(54) DEVICE AND PASSIVE METHOD FOR THE COHERENT COMBINATION OF TWO AMPLIFIED AND/OR SPECTRALLY BROADENED OPTICAL BEAMS

(75) Inventors: Dimitris Papadopoulos, Paris (FR); Marc Hanna, Limours (FR); Louis Daniault, Issy les Moulineaux (FR); Yoann Zaouter, Paris (FR); Frederic Druon, Orsay (FR)

(73) Assignees: ECOLE POLYTECHNIQUE, Palaiseau (FR); AMPLITUDE SYSTEMES, Pessac (FR)

( * ) Notice: Subject to any disclaimer, the term of this patent is extended or adjusted under 35 U.S.C. 154(b) by 0 days.

(21) Appl. No.: 14/232,314

(22) PCT Filed: Jul. 11, 2012

(86) PCT No.: PCT/FR2012/051644
§ 371 (c)(1),
(2), (4) Date: Feb. 5, 2014

(87) PCT Pub. No.: WO2013/007954
PCT Pub. Date: Jan. 17, 2013

(65) Prior Publication Data
US 2014/0153084 A1    Jun. 5, 2014

(30) Foreign Application Priority Data

Jul. 11, 2011  (FR) ...................................... 11 56292

(51) Int. Cl.
*H01S 3/067*    (2006.01)
*H01S 3/23*    (2006.01)
(Continued)

(52) U.S. Cl.
CPC ............... *H01S 3/2308* (2013.01); *H01S 3/005* (2013.01); *H01S 3/0057* (2013.01);
(Continued)

(58) Field of Classification Search
CPC .... G01B 9/02; G01B 9/02018; H01S 3/2308; H01S 3/2316; H01S 3/06758; H01S 3/005; H01S 3/04; H01S 3/10076; H01S 3/06704; H01S 3/06754; H01S 3/10023; H01S 3/2333
See application file for complete search history.

(56) References Cited

U.S. PATENT DOCUMENTS

| 3,530,388 A | 9/1970 | Guerra et al. |
| 5,307,369 A | 4/1994 | Kimberlin |

(Continued)

FOREIGN PATENT DOCUMENTS

| DE | 102 43 367 | 4/2004 |
| EP | 2 302 746 | 3/2011 |
| WO | 2009/132375 | 11/2009 |

OTHER PUBLICATIONS

International Search Report dated Oct. 1, 2012, corresponding to PCT/FR2012/051644.
(Continued)

*Primary Examiner* — Eric Bolda
(74) *Attorney, Agent, or Firm* — Young & Thompson

(57) ABSTRACT

A method and passive device for the coherent combination of two amplified and/or spectrally broadened optical beams using at least one bidirectional optical component (A1, A2), the device includes an amplitude division ring interferometer having optical splitting and recombining elements disposed so as to receive an incident optical beam ($S_0$) and to split it spatially into a first secondary input beam ($H_1$) and a second secondary input beam ($H_2$), optical guiding elements disposed so as to define an optical path in the form of a ring in the interferometer, the at least one bidirectional optical component being disposed on the optical path of the ring interferometer, the splitting and recombining elements being disposed in such a way as to receive and to recombine spatially, temporally and coherently the first secondary output beam ($H_1''$) and the second secondary output beam ($H_2''$), so as to form a coherent output beam.

16 Claims, 7 Drawing Sheets

(51) Int. Cl.
*H01S 3/00* (2006.01)
*H01S 3/10* (2006.01)

(52) U.S. Cl.
CPC .......... *H01S 3/06754* (2013.01); *H01S 3/2333* (2013.01); *H01S 3/0064* (2013.01); *H01S 3/06758* (2013.01); *H01S 3/06787* (2013.01); *H01S 3/10076* (2013.01); *H01S 2301/04* (2013.01)

(56) References Cited

U.S. PATENT DOCUMENTS

| | | | |
|---|---|---|---|
| 6,052,393 A * | 4/2000 | Islam | 372/6 |
| 2004/0190119 A1 | 9/2004 | Tauser et al. | |
| 2005/0100262 A1 * | 5/2005 | Yamashita | 385/11 |

OTHER PUBLICATIONS

L. Daniault, et al.; "Coherent Beam Combining of Two Femtosecond Fiber Chirped-Pulse Amplifiers"; vol. 36 No. 5; Mar. 1, 2011; pp. 621-623; XP001560608.

Louis Daniault, et al.; "Passive Coherent Beam Combining of Two Femtosecond Fiber Chirped-Pulse Amplifiers"; vol. 36, No. 20; Oct. 15, 2011; pp. 4023-4025; XP001570552.

D.A. Rockwell, et al.; "Coherent Coupling of Laser Gain Media Using Phase Conjugation"; vol. 11, No. 3; Mar. 1, 1986; pp. 147-149; XP000710377.

* cited by examiner $M_x^2 = 1.12$　　$M_x^2 = 1.15$　　$M_x^2 = 1.12$
$M_y^2 = 1.02$　　$M_y^2 = 1.08$　　$M_y^2 = 1.07$

DEVICE AND PASSIVE METHOD FOR THE COHERENT COMBINATION OF TWO AMPLIFIED AND/OR SPECTRALLY BROADENED OPTICAL BEAMS

BACKGROUND OF THE INVENTION

1. Field of the Invention

The present invention relates to a device and a method for the coherent combination of two optical beams transformed by optical components limited in energy and/or in average power and/or in peak power. Especially, the invention relates to a device and a method for the coherent combination of two optical beams amplified, for example, by two independent optical amplifiers. The invention also relates to a device and a method for the coherent combination of two optical beams spectrally broadened by two independent spectral broadening devices. The invention also relates to a device and a method for the coherent combination of two optical beams amplified and spectrally broadened, for example, by two non-linear optical amplifiers.

2. Description of the Related Art

It is searched to develop optical beams, and in particular energy laser beams with higher and higher peak power and/or average power while having an optical beam with an excellent spatial quality. It is also searched to develop reduced-volume devices based on the use of integrated optical components, such as an optical fiber amplifier, or a spectral broadening device based on a hollow capillary fiber, or on a large core (LMA or large mode area) fiber, or on small core fibers having particular dispersive properties. However, these optical components are limited in energy and/or in average power and/or in peak power. Different devices have been proposed to distribute the energy of a beam between several independent optical components, each optical component being limited in energy and/or in average power and/or in peak power. The difficulty is then to coherently recombine the different beams so as to preserve their spatial, spectral, temporal qualities, while increasing their energy, average power, peak power. In the case of the optical amplification, a first technique to obtain a high energy optical beam consists in amplifying a beam by two successive amplification stages. Starting from an oscillator generating initial pulses in the domain of 10 pJ to 1 µJ, a pre-amplifier allows obtaining pulses with intermediate energies of 10 nJ to a few µJ. A second optical power amplifier is necessary to reach the energies of 10 µJ to a few mJ required for most of the applications. However, the optical amplification in a non-linear optical medium is liable to generate non-linear effects (self-phase modulation . . . ) responsible for a deterioration of the optical quality of the amplified beam and more precisely of the temporal (ultra-short pulse) and/or spectral properties of the optical beam. Moreover, the high average power amplification may deteriorate the spatial properties of the beam (single-mode beam) due to the thermo-optical effects.

Another way to obtain a high energy and/or high power and/or high peak power beam is to use several sources or several independent amplifiers and to combine the beams coming from these different sources or from these different amplifiers. However, in order to preserve all the qualities of the laser beam, the recombination of the different beams must non only allow the spatial and temporal superimposition thereof, but also a coherent recombination, i.e. with a phase difference stable over time. The coherent combination of amplified laser beams is a very promising technique for the development of high energy and/or high average power and/or high peak power laser systems. However, the relative phases of different beams may fluctuate rapidly. The most difficult technical problem posed by the coherent recombination is to maintain a constant relative phase between different optical beams.

The coherent recombination of several optical beams has nevertheless been made by means of either passive or active devices.

The publication "Laser beam combining for High-Power, high-radiance sources", of T. Y. Fan, IEEE Journal of selected topics in Quantum Electronics, vol. 11, n° 3, 2005, indicates the fundamental conditions required to perform a recombination of laser beams (control of the power, relative phase, polarization, amplitude and alignment of each beam to be combined) and describes different methods for the coherent combination of optical beams, in order to obtain a high average power beam with spatial, temporal, spectral and almost-ideal polarization qualities.

The patent document U.S. Pat. No. 5,307,369 (D. E. Kimberlin) describes a passive system for the coherent combination of two amplifiers placed inside a common resonant cavity divided into two sub-cavities by a semi-reflective mirror. This device is similar to a double optical counter-reaction oscillator, a part of the beam emitted by the first laser amplifier being injected in the sub-cavity of the second laser amplifier, and vice versa. The output combined laser beam is a result of multiple coherent reflections occurring in the laser cavity. This device allows doubling the average power of a continuous laser beam or of synchronized laser pulses emitted by the two lasers. However, the differences of optical paths between the two sub-cavities induce phase-shifts that limit the stability of the passive device and the output power.

The passive combination appearing limited, various active devices for the coherent recombination of optical beams have been proposed. The active recombination is based on a direct or indirect measurement of the relative phase between the optical beams to be combined and on the introduction of a phase-shift actively controlled by a feedback loop on each optical beam. An active device for coherent recombination generally takes a part of the beam before or after recombination to extract therefrom a measurement of the phase-shift between the optical beams and adapts in real time the relative phase on each beam by means of an acousto-optic modulator, a piezoelectric mirror, or by adjustment of the optical pumping power.

Thus, for the amplifiers, an active device for coherent combination is generally used [Wei Liang, Naresh Satyan, Firooz Aflatouni, Amnon Yariv, Anthony Kewitsch, George Rakuljic, and Hossein Hashemi, "Coherent beam combining with multilevel optical phase-locked loops," J. Opt. Soc. Am. B 24, 2930-2939 (2007); T. Shay, V. Benham, J. T. Baker, A. D. Sanchez, D. Pilkington, and C. A. Lu, IEEE J. Sel. Top. Quantum Electron. 13, 480 (2007)]. The coherent combination has been shown in continuous and almost-continuous regime, and recently in femtosecond regime [cf. the publications L. Daniault, M. Hanna, L. Lombard, Y. Zaouter, E. Mottay, D. Goular, P. Bourdon, F. Druon, and P. Georges, "Coherent beam combining of two femtosecond fiber chirped-pulse amplifiers," Opt. Lett. 36, 621-623 (2011) and Enrico Seise, Arno Klenke, Jens Limpert, and Andreas Tünnermann, "Coherent addition of fiber-amplified ultrashort laser pulses," Opt. Express 18, 27827-27835 (2010)].

However, the active devices for coherent recombination are complicated because they need a real-time feedback electronic system whose implementation is difficult and expensive.

The power increase of the active devices for coherent recombination toward higher energies and/or average powers thus remains problematic.

SUMMARY OF THE INVENTION

One of the objects of the invention is to propose a device for the coherent combination of two amplified and/or spectrally broadened optical beams that is opticalstable over time and capable of supporting and generating high energies and/or powers and/or peak powers.

Another object of the invention is to propose a device and a method that can be applied to any temporal regime, from the continuous regime to the femtosecond pulses, to any type of optical amplifier or to any type of spectral broadening device, wherein the amplification can if need be simultaneously induce a spectral broadening.

The present invention has for object to remedy the drawbacks of the prior art techniques and relates more particularly to a passive device for the coherent combination of two amplified and/or spectrally broadened optical beams. According to the invention, said device comprises an amplitude-division ring interferometer, said interferometer comprising:

optical splitting and recombining means arranged so as to receive an incident optical beam and to spatially split it into a first secondary input beam and a second secondary input beam;

optical guiding means arranged so as to define a ring optical path in said interferometer, said first secondary input beam travelling through the ring interferometer in a clockwise direction to form a first secondary output beam and respectively said second secondary input beam travelling through the ring interferometer in a counterclockwise direction to form a second secondary output beam;

at least one bidirectional optical component arranged on the optical path of said ring interferometer, said at least one bidirectional optical component being adapted to amplify and/or spectrally broaden on the one hand a secondary optical beam propagating in a clockwise direction and on the other hand a secondary optical beam propagating in a counterclockwise direction;

said splitting and recombining means being arranged so as to receive and to spatially, temporally and coherently recombine said first secondary output beam and said second secondary output beam, to form an amplified and/or spectrally broadened output coherent beam.

According to various particular embodiments of the invention, the device further comprises:

optical isolation means arranged upstream of said ring interferometer so as to spatially split the incident optical beam and the amplified and/or spectrally broadened output coherent beam;

said optical guiding means comprise highly reflective mirrors, chirped mirrors, optical fiber sections, and/or polarization maintaining optical fiber sections and/or specific scattering optical fiber sections;

the device further comprises a reflective mirror or a Faraday mirror arranged on an output of the splitting and recombining optical means so as to reflect the first secondary output beam and the second secondary output beam toward the ring interferometer, so that said first secondary beam and second secondary beam travel a second time through the ring interferometer, respectively in mutually opposite directions, before being coherently recombined;

said splitting and recombining optical means comprise a polarization splitter arranged so as to split the incident beam into a first secondary input beam and a second secondary input beam, said first and second secondary input beams being linearly polarized in orthogonal polarizations, said device further comprising polarization means arranged on the path of the ring interferometer, said polarization means being configured so that the first secondary output beam is linearly polarized with a same polarization as the second secondary input beam and so that said second secondary output beam is linearly polarized with a same polarization as the first secondary input beam;

said polarization means comprise a half-wave plate, or two quarter-wave plates, a half-wave plate or two half-wave plates, or a Faraday rotator or a Faraday mirror, or a sub-unit comprising a polarization splitting cube, a quarter-wave plate and a reflective mirror;

said optical splitting and recombining means comprise a polarizer and/or a wave plate and/or an optical isolator, configured so as to recombine in a same polarization state said first secondary output beam and said second secondary output beam orthogonally polarized relative to each other;

said at least one bidirectional optical component comprises an optical amplifier with co-propagative pumping and/or with broadened opticalcounter-propagative pumping;

said at least one bidirectional optical component comprises a first bidirectional optical amplifier and a second bidirectional optical amplifier, said optical amplifiers being arranged in series on the optical path of the ring interferometer;

the first optical amplifier comprises a first optical fiber amplifier and said second optical amplifier comprises a second optical fiber amplifier;

said at least one bidirectional optical component comprises a first bidirectional optical component adapted to spectrally broaden said secondary optical beams and a second bidirectional optical component adapted to spectrally broaden said secondary optical beams.

The invention also relates to a method for the passive coherent combination of two amplified and/or spectrally broadened optical beams, said method comprising the following steps:

coupling an incident optical beam to an amplitude-division ring interferometer, said interferometer comprising optical splitting and recombining means and at least one bidirectional optical component arranged on the optical path of said ring interferometer, said at least one optical component being adapted to amplify and/or spectrally broaden on the one hand a secondary optical beam propagating in a clockwise direction in the interferometer and on the other hand a secondary optical beam propagating in a counterclockwise direction in the interferometer, spatially amplitude splitting the incident optical beam by said optical splitting and recombining means into a first secondary input beam and a second secondary input beam, optically guiding said first secondary input beam so that it travels through the ring interferometer in a clockwise direction and so that the first secondary input beam is amplified and/or spectrally broadened by said at least one optical component to form a first secondary output beam directed toward said optical splitting and recombining means;

optically guiding said second secondary input beam so that it travels through the ring interferometer in a counter-clockwise direction and so that the second secondary input beam is amplified and/or spectrally broadened by said at least one optical component to form a second secondary output beam directed toward said optical splitting and recombining means;

coherently spatially recombining the first secondary output beam and the second secondary output beam by said optical splitting and recombining means to form an amplified and/or spectrally broadened output coherent beam.

According to a preferred embodiment, the coherent combination method comprises:

the spatial amplitude splitting of the incident optical beam into a first secondary input beam and a second secondary input beam comprises a polarization splitting, said first secondary input beam and second secondary input beam being polarized orthogonally, the optical guiding in the ring interferometer comprises a polarization rotation of 90 degrees, said first secondary output beam having the same polarization as the second secondary input beam and the second secondary output beam having the same polarization as the first secondary input beam, the coherent spatial recombination comprises a recombination of the first secondary output beam and of the second secondary output beam, the polarizations of the first secondary output beam and of the second secondary output beam being orthogonal.

The invention will find a particularly advantageous application in the manufacturing of high energy and/or power and/or high peak power laser sources of good optical quality of beam.

The present invention also relates to the characteristics that will become more apparent from the following description and that will have to be considered in isolation or according to any of their technically possible combinations.

BRIEF DESCRIPTION OF THE DRAWING FIGURES

This description, which is given only by way of non-limitative example, will permit to better understand how the invention can be implemented with reference to the appended drawings, in which:

FIG. 1 schematically shows a passive device for the coherent combination of two amplified optical beams according to a first embodiment of the invention;

FIG. 2 schematically shows a passive device for the coherent combination of two amplified optical beams according to a first variant of a second embodiment of the invention;

FIG. 3 schematically shows a passive device for the coherent combination of two amplified optical beams according to a second variant of the second embodiment of the invention;

FIG. 4 schematically shows a device for the coherent combination of two amplified optical beams according to a third variant of the second embodiment of the invention;

FIG. 5 schematically shows a device for the coherent combination of two amplified optical beams according to a fourth variant of the second embodiment of the invention for one input polarization component;

FIG. 6 shows the same device as FIG. 5 for the other input polarization component;

FIG. 7 schematically shows a device for the coherent combination of two amplified optical beams according to a fifth variant of the second embodiment of the invention for one input polarization component;

FIG. 8 shows the same device as FIG. 7 for the other input polarization component;

FIG. 9 schematically shows a passive device for the coherent combination of two amplified optical beams according to a third embodiment of the invention;

FIG. 10 schematically shows a device for the coherent combination of two amplified optical beams according to a fifth variant of a second embodiment of the invention;

Figure 16:
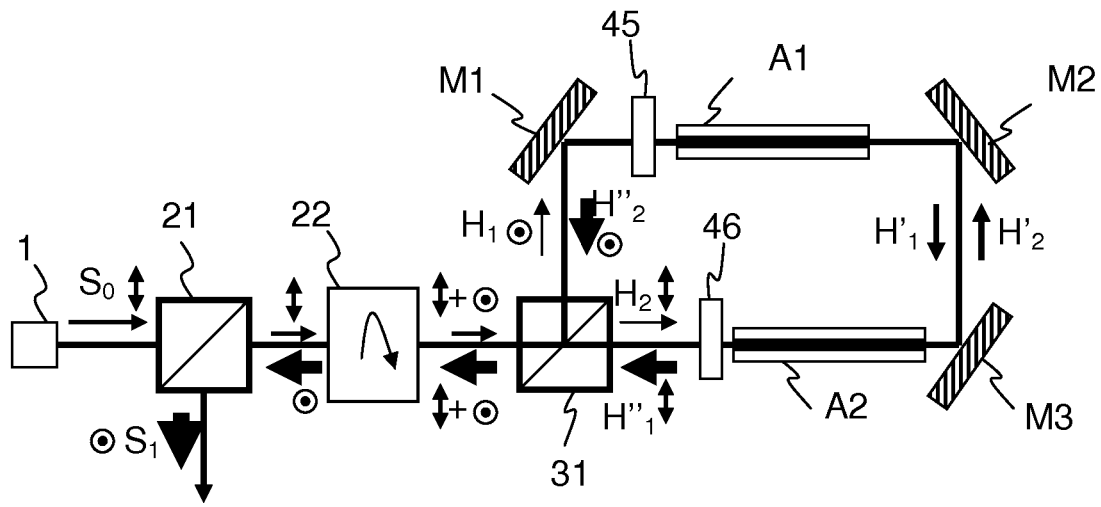
Figure 17:
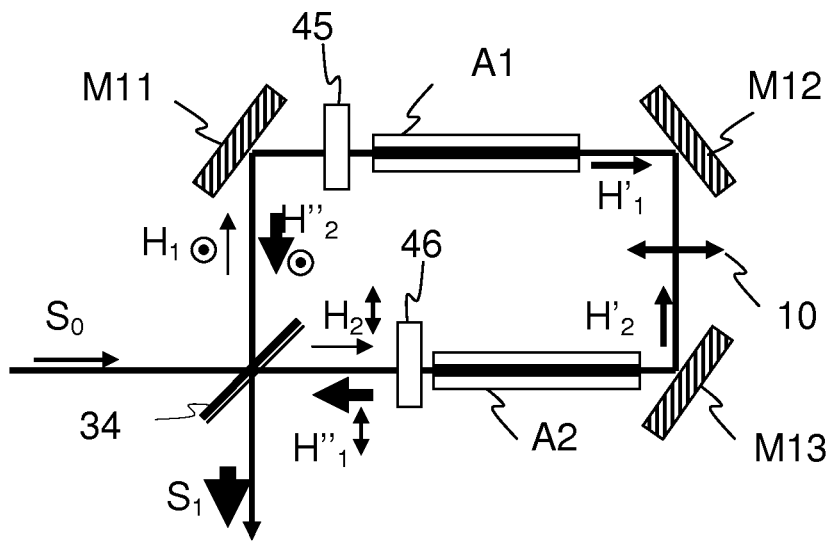
Figure 18:
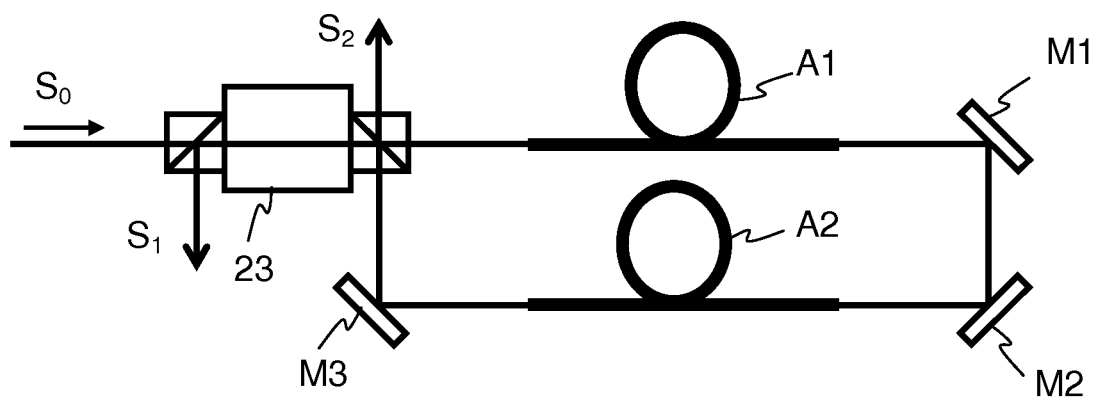

FIG. 16 schematically shows a passive device for the coherent combination of two spectrally broadened optical beams according to a first variant of the third embodiment of the invention;

FIG. 17 schematically shows a passive device for the coherent combination of two spectrally broadened optical beams according to a second variant of the third embodiment of the invention;

FIG. 18 schematically shows a device for the coherent combination of two spectrally broadened optical beams according to a third variant of the third embodiment of the invention.

DETAILED DESCRIPTION OF THE INVENTION

A first application of the invention to a device and a method for the coherent combination of two optical amplifiers, wherein each optical amplifier is limited in average power and/or in peak power and/or in energy, will be described in relation with FIGS. 1 to 15.

Figure 1:
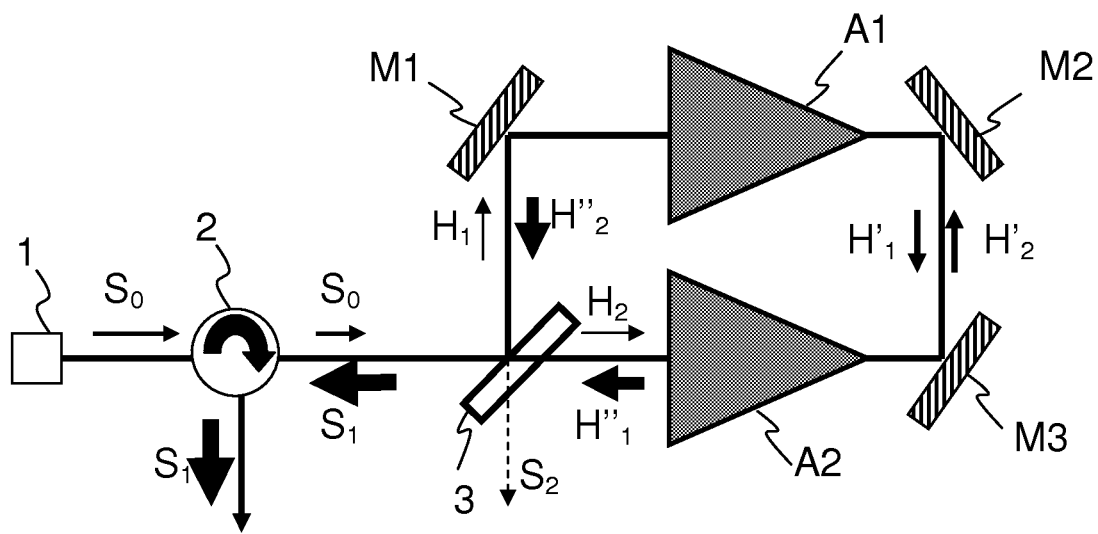

A passive device for the coherent recombination according to a first embodiment is shown in FIG. 1. The principle of operation is based on the use of a ring interferometer, for example a Sagnac interferometer, in which the reciprocity of the opposite optical paths is used advantageously.

A Sagnac interferometer is generally used to measure the Sagnac effect so as to deduce therefrom a measurement of rotation. By construction, the optical waves propagating in a Sagnac interferometer in a clockwise and counterclockwise direction, respectively, follow perfectly reciprocal optical paths. A Sagnac interferometer uses optical components in free space or with optical fiber to form an optical loop long enough to be sensitive to the Sagnac effect whose amplitude is very low. In an optical-fiber gyroscope, the length of the optical loop is generally comprised between several hundreds of meters and several kilometers.

FIG. 1 schematically shows a passive device for the coherent combination of two amplified beams according to a first embodiment of the invention. A source 1 generates an incident light beam $S_0$ that is to be amplified. An optical circulator 2 sends the incident beam $S_0$ to the input of a ring interferometer. On the schema of FIG. 1, an interferometer in free space has been shown, comprising a set of highly reflective mirrors M1, M2, M3, which form the ring path of the interferometer. A splitting plate 3 spatially splits the incident beam $S_0$ into a first secondary input beam $H_1$ and a second secondary input beam $H_2$. Preferably, the splitting plate is chosen so that the secondary input beams $H_1$ and $H_2$ have an equal power. However, an unequal splitting of the two secondary beams may be used advantageously to compensate for a possible unbalance in power and/or in peak power and/or in polarization and/or in non-linear effects of the two optical paths of the interferometer. This unequal distribution of the secondary input beams $H_1$ and $H_2$ will then allow a better efficiency of coherent combination. The first secondary input beam $H_1$ is reflected by the splitting plate 3 and travels along the optical path of the ring interferometer in a clockwise rotation direction, up to the splitting plate 3 that transmits the first secondary output beam ($H"_1$). Reciprocally, the second secondary input beam $H_2$ enters into the ring interferometer by transmission through the splitting plate 3, travels along the optical path of the ring interferometer in a counterclockwise rotation direction, up to the splitting plate 3 that reflects the second secondary output beam ($H"2$).

A first optical amplifier A1 and a second optical amplifier A2 are arranged in series on the optical path of the ring interferometer. The two optical amplifiers A1, A2 are bidirectional optical amplifiers, i.e. they are adapted to amplify an optical beam propagating in two respectively opposite directions. Each optical amplifier A1, A2 is provided with its own optical pumping means (not shown). Preferably, the two optical amplifiers are similar (same gain, same bandwidth . . . ) and arranged symmetrically on the optical path of the ring interferometer. However, it is not necessary that the two optical amplifiers A1, A2 are strictly identical. The first secondary input beam $H_1$ thus passes first through the first amplifier A1, then through the second amplifier A2. The first secondary beam $H_1$ is thus amplified a first time by the first amplifier A1 to form a once-amplified beam $H'_1$, then the once-amplified beam $H'_1$ is itself amplified by the second amplifier A2 and forms a first output amplified secondary beam $H"_1$ (twice-amplified). Reciprocally, the second secondary input beam $H_2$ passes first through the second amplifier A2, then through the first amplifier A1. The second secondary beam $H_2$ is thus amplified a first time by the second amplifier A2 to form a once-amplified beam $H'_2$, then the once-amplified beam $H'_2$ is itself amplified by the first amplifier A1 and forms a second output amplified secondary beam $H"_2$ (twice-amplified). The splitting plate 3 receives the first output amplified secondary beam $H"_1$ and the second output amplified secondary beam $H"_2$ and recombines them coherently to form an output amplified beam $S_1$. The optical circulator 2 spatially splits the output amplified beam $S_1$ of the incident beam $S_0$ so at to avoid damaging the optical source.

The first secondary output beam $H"_1$ and the second secondary output beam $H"_2$ have traveled through the ring interferometer along paths that are reciprocal to each other at the first order. Indeed, these two beams travel through the ring interferometer following optical paths that are spatially superimposed to each other. The optical paths following the clockwise direction and the counterclockwise direction having the same wavelength, the first secondary output beam $H"_1$ and the second secondary output beam $H"_2$ are also temporally superimposed to each other. These two beams each undergo a transmission and a reflection on the splitting plate 3, a same number of reflections on the mirrors M1, M2, M3, an amplification by the first optical amplifier A1 and an amplification by the second optical amplifier A2. Thus, the first output amplified secondary beam $H"_1$ and the second output amplified secondary beam $H"_2$ have, by construction, a stable relative phase at the first order. The ring construction following reciprocal optical paths thus allows recombining coherently the first output amplified secondary beam $H"_1$ and the second output amplified secondary beam $H"_2$. According to a preferred embodiment, the first output amplified secondary beam $H"_1$ and the second output amplified secondary beam $H"_2$ have equal amplitudes so that the recombined beam at the output of the interferometer has a maximum intensity. The optical pumping means of the first amplifier A1 and of the second amplifier A2 may be adjusted so as to ensure an equilibrated amplification of the two amplifiers A1, A2. Alternatively, if the phases accumulated in the amplifiers A1 and A2 differ by $\pi$, then the coherent combination is operated on the output $S_2$.

Figure 2:
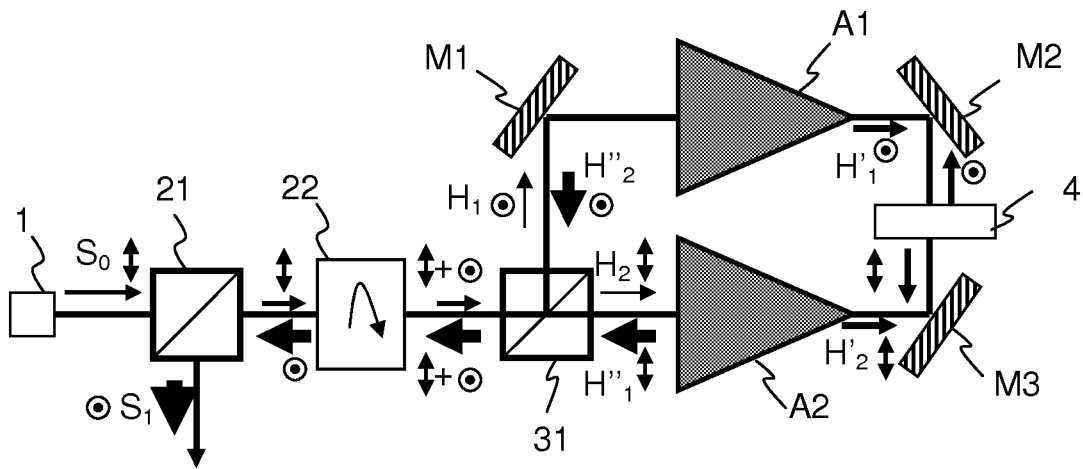

FIG. 2 schematically shows a passive device for the coherent combination of two amplified beams according to a first variant of the second embodiment of the invention, the same reference signs corresponding to the same elements as those described in detail in relation with FIG. 1. The embodiment illustrated in FIG. 2 uses polarization states to differentiate the path followed by the secondary beams. The device of FIG. 2 comprises an optical source 1 generating an incident beam $S_0$ that is herein polarized linearly. In FIG. 2, a beam polarized linearly following a polarization parallel to the plane of the figure (polarization p) is symbolized by a double arrow and a beam polarized perpendicular to the plane of the figure (polarization s) is symbolized by a disc. The device of FIG. 2 also comprises a first polarization splitting cube 21 followed with a first polarization rotator 22, which is for example a Faraday rotator, a phase plate or a quarter-wave plate. The separating plate 3 is replaced by a second polarization splitting cube 32 oriented parallel to the first polarization splitting cube 21. The second polarization splitting cube 32 forms the input-output of the ring interferometer. Similarly to the device of FIG. 1, the ring interferometer comprises a first optical amplifier A1 and a second optical amplifier A2 arranged in series on the reciprocal optical path of the interferometer. The interferometer further comprises a second polarization rotator 4 arranged on the optical path of the ring interferometer, for example between the first amplifier A1 and the second amplifier A2, as illustrated in FIG. 2. The one skilled in the art will understand that the second polarization rotator can be arranged at another place on the optical path of the ring interferometer and can, in particular, be integrated to the first optical amplifier A1 and/or to the second optical amplifier A2.

At the input of the device of FIG. 2, the linearly polarized incident beam $S_0$ of polarization p is transmitted by the first polarization splitting cube 21 oriented parallel to the polarization of the incident beam $S_0$. The first polarization rotator 22 receives the p-polarized incident beam $S_0$ and rotates the polarization axis of the incident beam by 45 degrees. The second polarization splitting cube 32 is arranged so as to receive a linearly polarized incident beam comprising a component of polarization p and a component of polarization s. The second polarization splitting cube 32 splits the incident beam into two secondary input beams polarized orthogonally: a first secondary input beam $H_1$ of polarization s and a second secondary input beam $H_2$ of polarization p. The first secondary beam travels through the interferometer in the clockwise direction from a first port of the splitting cube 32 to a second port of the same splitting cube 32. Reciprocally, the second secondary beam travels through the interferometer in the counterclockwise direction from the second port of the splitting cube 32 to the first port of the same splitting cube 32. The first secondary input beam $H_1$ of polarization s is amplified by the first amplifier A1 to form a once-amplified beam H'₁ of polarization s. The second polarization rotator 4 is for example a half-wave plate. The second polarization rotator 4 rotates the polarization of the beam H'₁ by 90 degrees so as to form a beam of polarization p directed toward the second amplifier A2. The second amplifier A2 amplifies the first secondary once-amplified beam of polarization p and forms a first output amplified secondary beam H"₁ of polarization p. Reciprocally, the second secondary input beam H₂ of polarization p is amplified by the second amplifier A2 to form a second once-amplified beam H'₂ of polarization p. The second polarization rotator 4 rotates the polarization of the beam H'₂ by 90 degrees so as to form a beam of polarization s directed toward the first amplifier A1. The first amplifier A1 amplifies the second once-amplified secondary beam of polarization s and forms a second output amplified secondary beam H"₂ of polarization s. The polarization splitting cube 32 receives the first output amplified secondary beam H"₁ of polarization p on the second port and the second output amplified secondary beam H"₂ of polarization s on the first port, and recombine them coherently to form an output amplified beam S₁ linearly polarized at 45 degrees, i.e. comprising a component of polarization p and a component of polarization s of same amplitude. The first polarization rotator 22 rotates the polarization axis of the amplified coherent beam by 45 degrees so as to form an output amplified beam S₁ of polarization s. The first polarization splitting cube 21 reflects the amplified beam S₁ of polarization s so as to split it from the incident beam S₀ of polarization p. The device of FIG. 2 thus allows recombining spatially, temporally, coherently and following a same polarization state, the first and second output amplified secondary beams H"₁ and H"₂.

At the input of the device of FIG. 2, the linearly polarized incident beam S₀ of polarization p. The one skilled in the art will easily adapt the device for a linearly polarized incident beam S₀ of polarization s.

Figure 3:
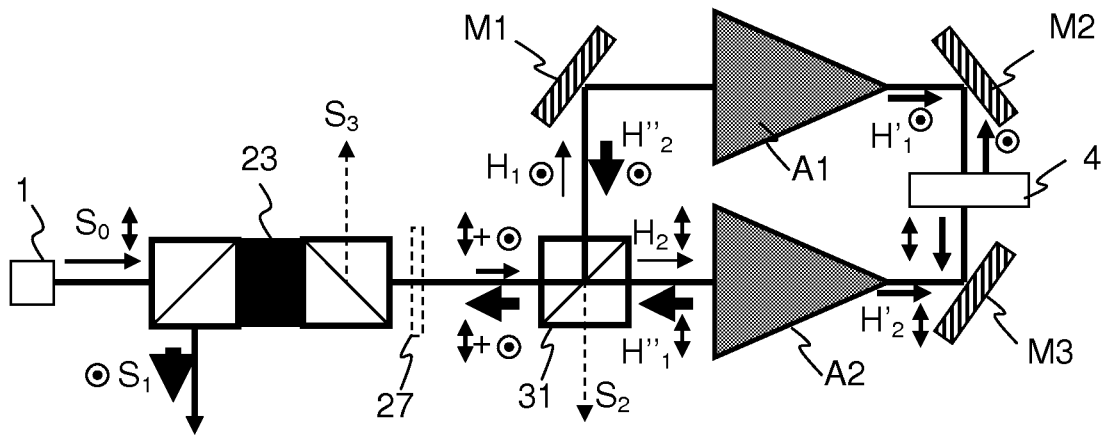

FIG. 3 schematically shows a passive device for the coherent combination of two amplified beams according to a second variant of the second embodiment of the invention. The device of FIG. 3 also uses polarization states to differentiate the path followed by the clockwise and counterclockwise secondary beams, respectively, the same reference characters corresponding to the same elements as those in FIG. 2. In place of the splitting cube 21 and of the first polarization rotator 22, a Faraday isolator is used, which is composed of a Faraday rotator placed between two polarizers crossed at 45 degrees relative to each other. The beam splitter-combiner component 32 at the input of the optical loop is an amplitude beam splitter, the polarization recombination of the secondary output beams being performed on the first polarizing cube of the Faraday isolator 23. Moreover, the operation of the device of FIG. 3 is similar to that of the device of FIG. 2. On the other hand, according to the orientation of the plate 4, it may be advantageous to recover the recombined signal S₂ on the second output of the polarization splitting cube 31. The output S₃ on the isolator corresponds to a complementary part of the output signal that is not rejected in S₁ and recombined in S₂.

Optionally, the device of FIG. 3 may comprise a phase plate 27, for example a half-wave plate, to adjust the power distribution between the two secondary beams. The orientation of the plate 27 may allow equilibrating to 50%-50% the power of the two secondary beams, or on the contrary to allow obtaining a power distribution 45%-55% between the two paths, or 30%-70%. Indeed, it is sometimes difficult to obtain an equal power on the two secondary output beams, the two amplifiers A1 and A2 being not necessarily identical. The half-wave plate 27 may allow making up the power or energy dissymmetry between the clockwise path and the counterclockwise path, and thus increasing the coherent combination efficiency.

Figure 4:
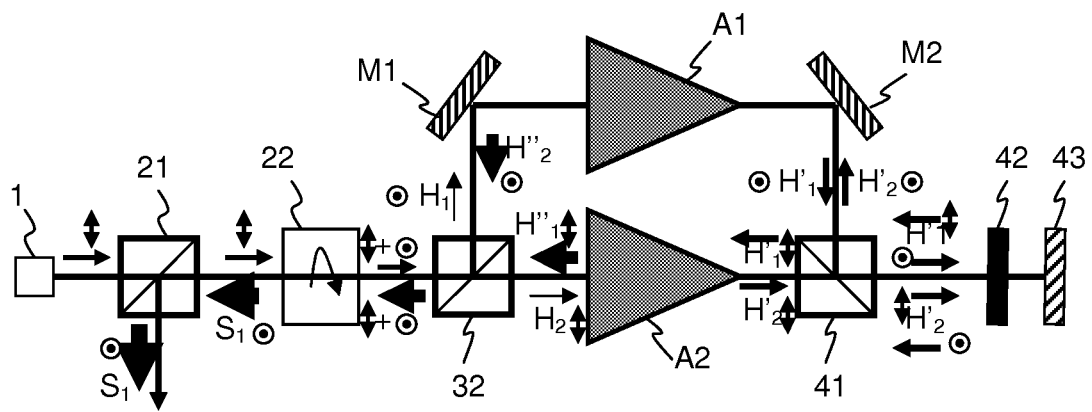

FIG. 4 schematically shows a passive device for the coherent combination of two amplified beams according to a third variant of the second embodiment of the invention. The device of FIG. 4 also uses polarization states to differentiate the path followed by the secondary beams, the same reference signs corresponding to the same elements as those in FIG. 2. In place of the polarization rotator 4, the device of FIG. 4 comprises a third polarization splitting cube 41, a quarter-wave plate 42 or a Faraday rotator and a return mirror 43. Similarly to the device of FIG. 2, the incident beam S₀ is split into two secondary input beams H₁, H₂ of same power and polarized orthogonally. The first secondary input beam H₁ is amplified by the first optical amplifier A1 while the second secondary input beam H₂ is amplified by the second optical amplifier A2. At the output of this first amplification, the once-amplified beams H'₁ and H'₂ are spatially covered by the third polarization splitting cube 41. The s-polarized, first once-amplified secondary beam H'₁ is reflected, while the p-polarized, second once-amplified secondary beam H'ₛ is transmitted by the third polarization splitting cube 41. The once-amplified secondary beams H'₁ and H'₂ thus follow a common path, are reflected by the mirror 43, and each undergo a double passage in the quarter-wave plate 42. This double passage induces a rotation of 90 degrees of the linear polarization state of each secondary beam H'₁ and H'₂, respectively. The p-polarized, first secondary beam H'₁ is then directed toward the second amplifier A2. Likewise, the s-polarized, second secondary beam H'₂ is directed toward the first amplifier A1. The first secondary beam H₁ is thus amplified successively in A1 and A2, and vice versa, for the second secondary beam H₂. The output amplified beams H"₁ and H"₂ are then recombined on the polarization splitting cube 33 with the same phase, the same group delay, orthogonal linear polarization states, and the same spatial profile. Finally, the passage in the polarization rotator 22 and the splitting cube 21 allows recombining the two orthogonal polarization components and splitting the s-polarized output coherent amplified beam S₁ from the p-polarized input beam S₀.

Figure 5:
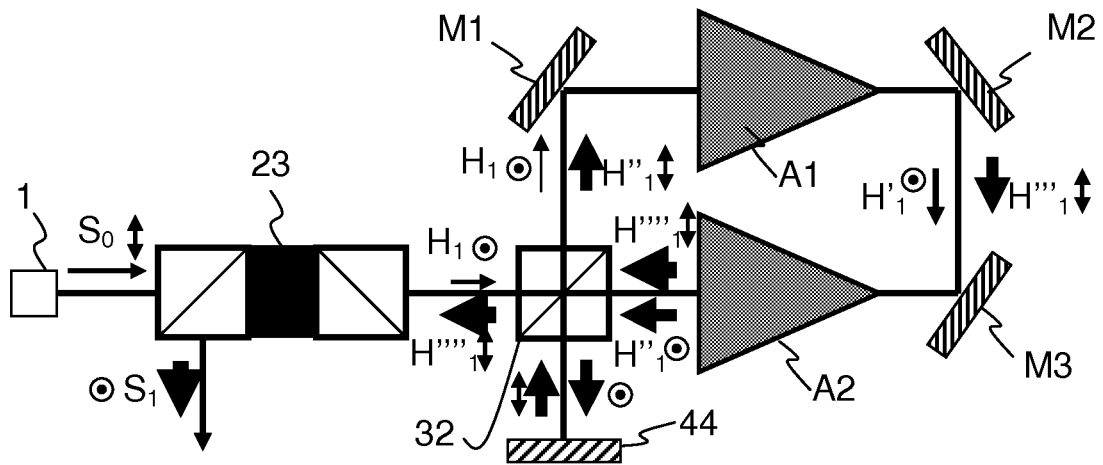
Figure 6:
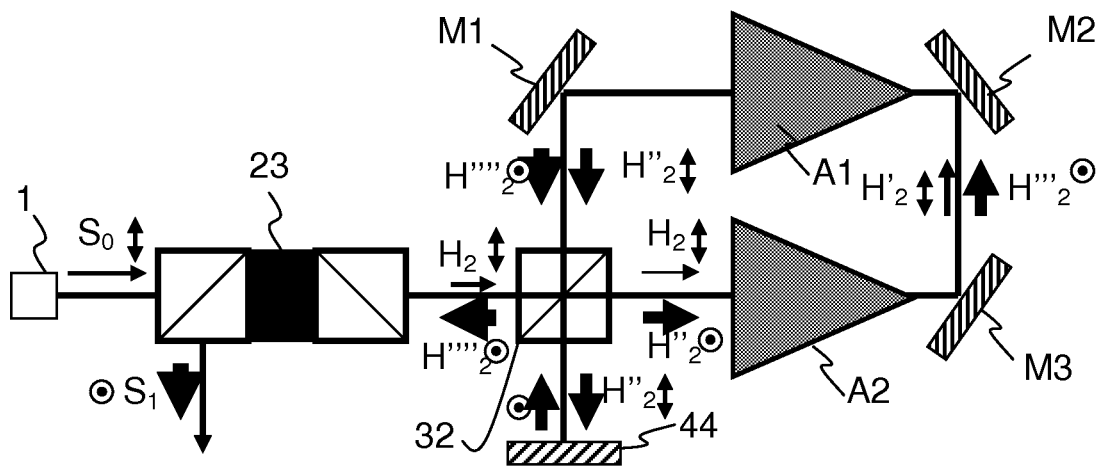

FIGS. 5 and 6 schematically show a passive device for the coherent combination of two amplified beams according to a fourth variant of the second embodiment of the invention. FIG. 5 shows the propagation of the s-polarized component of the input beam and FIG. 6 shows the propagation of the p-polarized component of the input beam, the same reference signs corresponding to the same elements as those in FIG. 2. In place of the polarization rotator 4, the device of FIG. 5 comprises a Faraday mirror 44 arranged on an output of the polarization splitting cube 32. In FIG. 5, the s-polarized, first secondary input beam (H₁) travels through the interferometer in the clockwise direction while being amplified a first time by the first optical amplifier A1, then by the second optical amplifier A2, without changing of polarization. At the end of a rotation in the clockwise direction, the twice-amplified beam H"₁ is reflected by the polarization splitting cube 32 toward the Faraday mirror 44. After reflection on the Faraday mirror 44, the amplified beam H"₁ has changed of polarization, is p-polarized, and is transmitted by the polarization splitting cube 32 toward the optical loop of the interferometer, here again in the clockwise direction. The first secondary beam is then amplified a second time by the first optical amplifier A1, then by the second optical amplifier A2, following the same path but with a polarization perpendicular to that of the first passage. The first secondary beam is then amplified twice by the first amplifier A1 and twice by the second amplifier A2 to form a p-polarized beam H''''$_1$ on the splitting cube 32, where it is transmitted toward the optical isolator 23.

Reciprocally, as can be seen in FIG. 6, the p-polarized, second secondary input beam H$_2$ travels a first time along the loop of the interferometer following the counterclockwise direction, without changing of polarization, then the beam H''$_2$ amplified a first time by the second optical amplifier A2 and by the first optical amplifier A1 is transmitted by the polarization splitting cube 32 toward the Faraday mirror 44. After reflection on the Faraday mirror 44, the amplified beam H''$_2$ is reflected by the polarization splitting cube 32 toward the optical loop of the interferometer, here again in the counterclockwise direction but this time s-polarized. The second secondary beam is then amplified a second time by the second optical amplifier A2, then by the first optical amplifier A1, following the same counterclockwise path. When the second secondary beam amplified four times comes back on the splitting cube, it is transmitted toward the optical isolator 23.

The splitting cube 32 and the optical isolator 23 recombine in polarization the two secondary output beams H''''$_1$ and H''''$_2$ each amplified by the double passage in the two optical amplifiers A1 and A2. The device of FIG. 5 thus allows multiplying by two the number of passages of the beam in each amplifier. This configuration is particularly advantageous for the low-gain optical amplifiers A1, A2.

Figure 7:
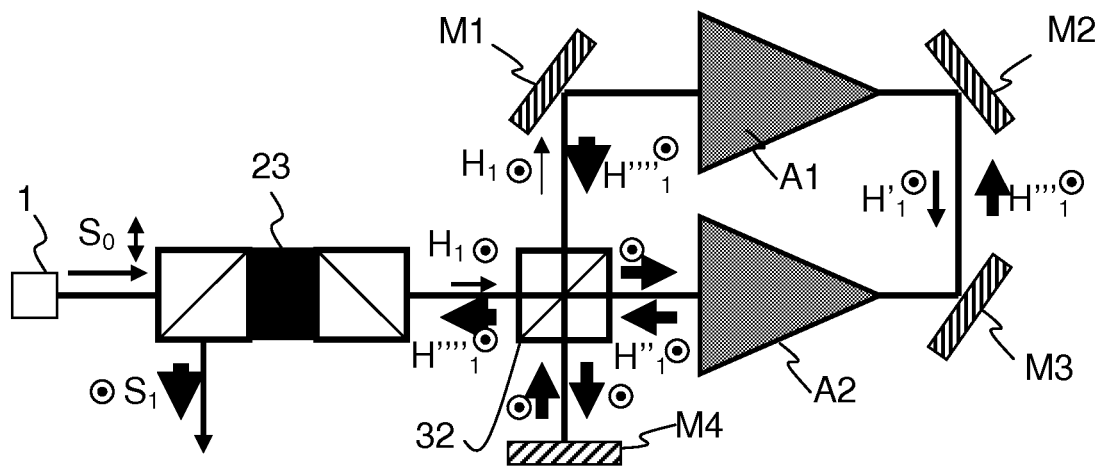
Figure 8:
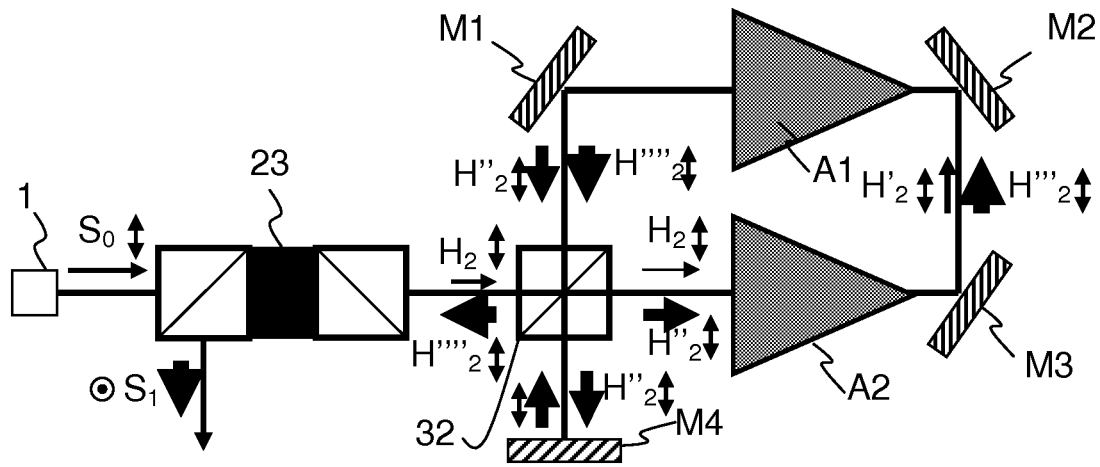

FIGS. 7 and 8 schematically show a passive device for the coherent combination of two amplified beams according to a fifth variant of the second embodiment of the invention. The device is similar to that described in relation with FIGS. 5 and 6, the Faraday mirror 44 being herein replaced by a highly-reflective mirror M4 that does not modify the polarization of the beam during the reflection. However, in FIG. 7, it is observed that the secondary beam travels once along the loop of the interferometer in the clockwise direction, is reflected on the mirror M4, then travels a second time along the loop of the interferometer in the counterclockwise direction, without changing of polarization (cf. FIG. 7). Reciprocally, in FIG. 8, it is observed that the secondary beam travels once along the loop of the interferometer in the counterclockwise direction, is reflected on the mirror M$_4$, and travels a second times along the loop of the interferometer in the clockwise direction, without changing of polarization (cf. FIG. 8). According to this fifth variant, the s-polarized secondary beam is reflected four times by the splitting cube 31. Reciprocally, the p-polarized secondary beam is transmitted four times by the splitting cube 31. The device of FIGS. 7 and 8 also amplifies four times each secondary beam by two passages in the amplifier A1 and two passages in the amplifier A2.

Figure 9:
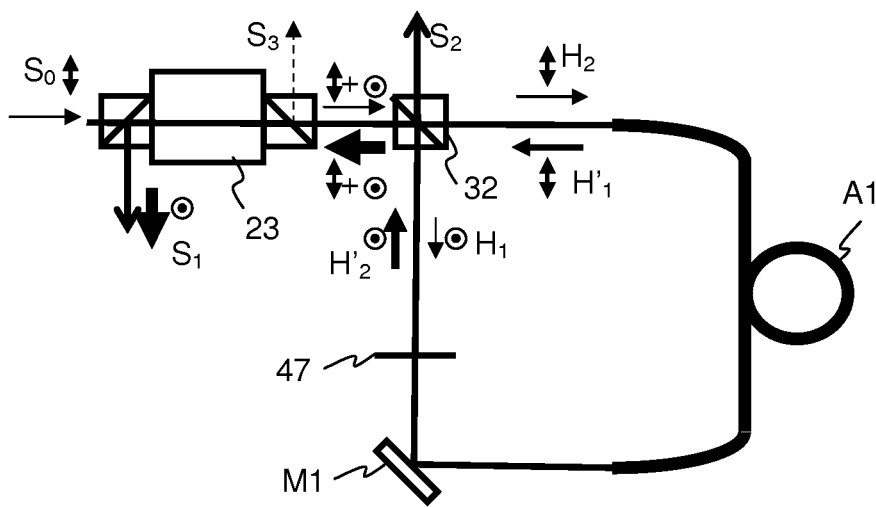

FIG. 9 schematically shows a passive device for the coherent combination of two amplified optical beams according to a third embodiment of the invention. The device of FIG. 9 comprises a single bidirectional optical fiber amplifier A1 and a half-wave plate 47 on the optical path of the interferometer. The input beam S$_0$ is polarized linearly, and after having passed through the optical isolator 23, the axes of polarization of the input beam are at 45 degrees relative to the proper axes of the polarization splitter 32 at the input of the ring interferometer. The splitter splits the s-polarized component H$_1$ and the p-polarized component H$_2$. On the schema of FIG. 9, the component H$_1$ initially s-polarized travels through the interferometer in the counterclockwise direction, whereas the component H$_2$ initially p-polarized travels through the interferometer in the clockwise direction. The secondary beam H$_1$ passes through the half-wave plate and becomes p-polarized. The amplifier A1 receives and amplifies the p-polarized secondary beam H$_1$ propagating in the counterclockwise direction and forms an amplified secondary beam H'$_1$. Reciprocally, the amplifier A1 receives and amplifies the p-polarized secondary beam H$_2$ propagating in the clockwise direction and forms an amplified secondary beam H'$_2$. The amplified secondary beam H'$_2$ passes trough the half-wave plate and becomes s-polarized. The polarization splitter-combiner 32 recombines the two p-polarized H'$_1$ and s-polarized H'$_2$ amplified secondary beams. If the two amplified secondary beams H'$_1$ and H'$_2$ have the same amplitude, the recombined beam is linearly polarized with a polarization axis at 45 degrees relative to the proper axes of the polarization splitter-combiner 32. The amplifier A1 is advantageously an optical fiber amplifier pumped in a co-propagative manner by one end and pumped in a counter-propagative manner by the other end. The double pumping allows symmetrizing the inversion of population, the longitudinal distribution of the gain and thus the non-linearities of the amplifier A1 of the two directions of amplification. However, the recombination of the two amplified secondary beams is coherent, because they have traveled along reciprocal optical paths in the ring interferometer. Advantageously, the optical fiber amplifier A1 comprises a polarization-maintaining amplifying optical fiber, whose proper axes are aligned with respect to the polarization of the secondary beams. According to a variant of the $3^{rd}$ embodiment, the half-wave plate is arranged on the optical path of the secondary beams H'$_1$ and H$_2$. According to another variant of the $3^{rd}$ embodiment, the device comprises two half-wave plates arranged on either side of the amplifier A1. According to the other variant of the $3^{rd}$ embodiment, no wave plate is placed on the optical path where they are aligned so as not to change the polarization state of the optical beams. Thus, the polarization of the secondary output beam H'$_1$ is the same as the polarization of the secondary input beam H$_1$. Reciprocally, the polarization of the secondary output beam H'$_2$ is the same as the polarization of the secondary input beam H$_2$. Hence, the coherent recombination of the beams is performed on the output S$_2$.

According to a first variant of the third embodiment, the device of FIG. 9 comprises a highly reflective mirror M$_4$ arranged on the output port of the signal S$_2$, so as to reflect the two secondary beams once-amplified by the amplifier A1 toward the ring interferometer. That way, each secondary beam travels once again through the ring interferometer, following a reverse path relative to the first loop, and with the same polarization. This variant allows amplifying twice each secondary beam by a single amplifier A1, before recombining the secondary beams.

According to a second variant of the third embodiment, the device comprises a Faraday mirror 44 arranged on the output port of the signal S$_2$, so as to reflect the two secondary beams once-amplified by the amplifier A1 toward the ring interferometer. That way, each secondary beam travels once again through the ring interferometer, following a reverse path relative to the first loop and with an orthogonal polarization. This variant also allows twice-amplifying each secondary beam by a single amplifier A1, before recombining the secondary beams.

Figure 10:
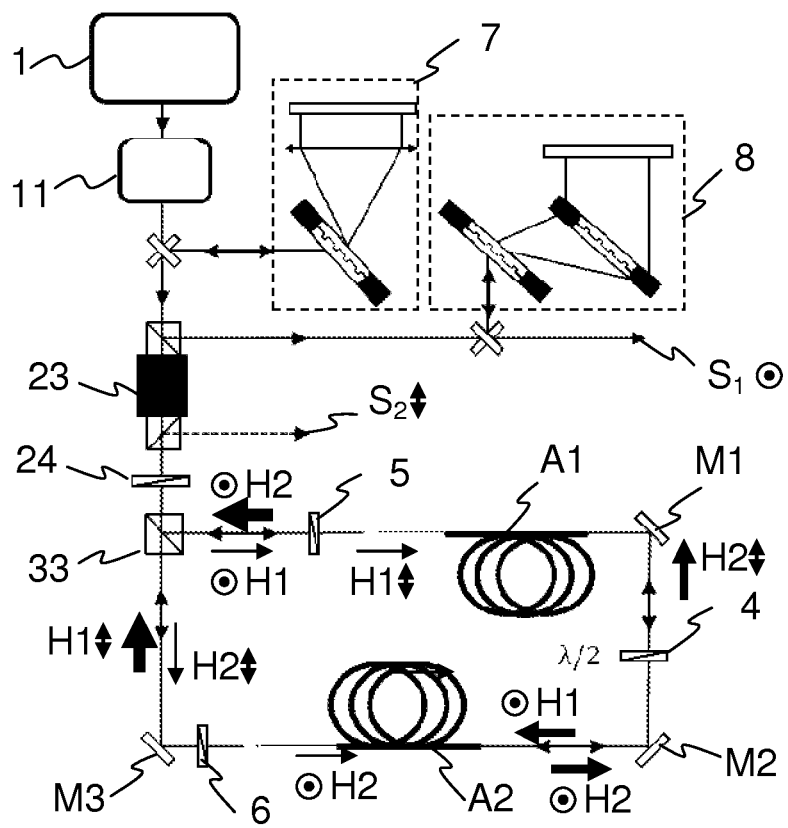

FIG. 10 represents a device for the coherent combination of two amplified optical beams according to a fourth embodiment of the invention. The splitting/recombining device herein also uses the polarization of the beams. The amplifiers A1 and A2 are rare-earth-doped polarization-maintaining optical fiber amplifiers. According to an exemplary embodiment, each amplifier A1, A2 comprises an Ytterbium-doped core, double clad, optical fiber section of 1.6 m length. The source is an oscillator that generates pulses of 250 fs at a repetition rate of 35 MHz. The oscillator is followed by a pulse picker 11 and by a stretcher 7 that temporally stretches the pulses up to 150 ps. The incident beam coming from the stretcher 7 is coupled to a ring interferometer and the output beam $S_1$ is transmitted to a compressor 8 that temporally recompresses the amplified pulses. The device comprises an optical isolator 23, a half-wave plate 24 and a polarization splitter cube 33. The optical isolator 23 allows the coherent recombination of the amplified beams and the extraction of the amplified beam $S_1$. The isolator 23 allows projecting the two orthogonal polarizations at 45 degrees so that the amplified beams $H''_1$ and $H''_2$ interfere with each other. The first output of the isolator 22 rejects the non-recombined part $S_2$ of the output beam. The second output of the isolator 22 allows extracting the recombined beam $S_1$. Half-wave plates, in the interferometer (4, 5 and 6) and outside of the interferometer (24) are used to adjust finely the power distribution between the arms so as to obtain the best degree of coherent combination. At each instant, the first amplifier A1 amplifies the first secondary beam $H_1$ propagating in the clockwise direction of the interferometer and the second secondary beam $H'_2$, once-amplified by the second amplifier A2, that propagates in the counterclockwise direction. Likewise, at each instant, the second amplifier A2 amplifies the second secondary beam $H_2$ propagating in the counterclockwise direction of the interferometer and the first secondary beam $H'_1$, once-amplified by the first amplifier A1, that propagates in the clockwise direction. Each amplifier A1, respectively A2, thus operates as a preamplifier for a secondary beam and as a power amplifier for the other secondary beam. Each beam $H_1$, $H_2$ is amplified in the two identical amplifiers A1 and A2. The two optical amplifiers A1, A2 are configured such that the amplification is possible in each of the propagation directions. At the output, the input of an amplifier is injected in the output of the other and vice-versa. The beam $H'_1$ is thus amplified once again in A2, and the beam $H'_2$ is amplified in A1, the direction of propagation being now reversed. The system being symmetrical, the two beams propagating in opposite directions have seen the same optical path and the same gain of amplification. Indeed, this interferometer is similar to a Sagnac interferometer, to the notable difference that it comprises non-linear optical amplifiers arranged in the loop. The two doubly amplified beams are thus recombined on the input-output splitter, with the same phase, the same group delay, the same polarization state and the same spatial profile. Therefore, the almost-totality of the power is redirected toward the polarization rotator 22 by the polarization splitting cube 32. By passing in the polarization rotator 22, the polarization state is modified in such a way that the recombined output beam $S_1$ is ejected by the first polarization splitting cube 21. The compensation for dissymmetry appearing in a real experimental system may be made a many places in the system (alignment, pumping of the amplifiers, power distribution of the secondary input beams, etc.).

For each secondary beam, the pumping is co-propagative during the first amplification and counter-propagative for the second amplification. This arrangement allows limiting the B integral due to the self-phase modulation (SPM) and thus preserving an excellent spatial quality of optical beam. The length of the optical beam for a complete rotation in the interferometer is 5 m. Therefore, the device is not much sensitive to the phase noises at frequencies lower than 10 MHz, the thermal and acoustic noises being limited beyond 10 kHz. The combination of the beams at the output of the interferometer is thus very stable in phase and resistant to the environment disturbances.

Figure 11:
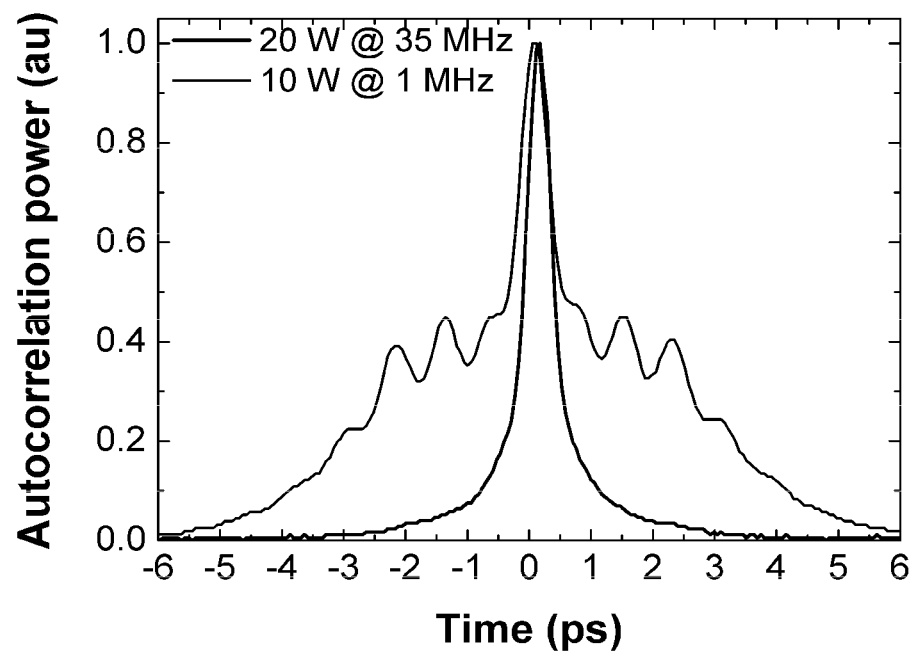
FIG. 11 shows an autocorrelation measurement for amplified femtosecond pulses, respectively for a total power of 20 W at 35 MHz and of 10 W at 1 MHz.

The device of FIG. 10 operates firstly with a repetition frequency of 35 MHz and a power of the incident beam $S_0$ of 300 mW. A pump power of 50 W for each amplifier A1, A2 allows obtaining an output beam having a power of 20 W with a combination efficiency of 95%. The lack of combination efficiency is due essentially to the amplified spontaneous emission, and to the alignments defects. The pulse duration is relatively well preserved, the output pulse duration being of 270 fs (FWHM), as illustrated in FIG. 11, which represents the autocorrelation for a pulse of 20 W at a repetition frequency of 35 MHz and, respectively, for a pulse of 10 W to a repetition frequency of 1 MHz.

Figure 12:
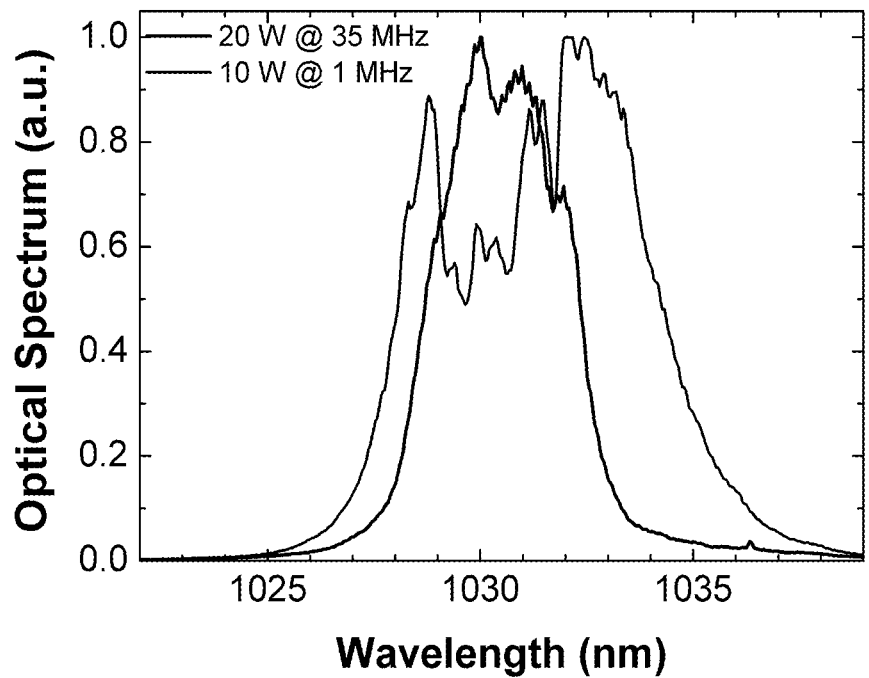
FIG. 12 shows an optical spectrum measurement for amplified femtosecond pulses, respectively for a total power of 20 W at 35 MHz (blue) and of 10 W at 1 MHz (red)

To obtain a higher peak power, the repetition frequency is fixed to 1 MHz. However, the accumulated non-linear phase becomes non negligible and must be identical for the two contra-propagative beams to maintain a good efficiency of combination. This may be made in practice by adjusting the power of the pumps and the conditions of injection. Considering that the self-phase modulation occurs especially at the output of a power amplifier, each amplifier A1, A2 control the non-linear phase of only one of the two beams, with little effect of the other beam. This is observed experimentally and the tolerance on the pump power is of about 100 mW. FIG. 12 shows the optical spectrum for a pulse of 20 W at a repetition frequency of 35 MHz and, respectively, for a pulse of 10 W at a repetition frequency of 1 MHz. At 10 W, the energy is of about 10 μJ and the B integral on each beam is of 12 rad. This high value of the B integral fully deforms the pulse (cf. FIGS. 11 and 12), however the coherent combination efficiency remains high at 84%.

Figure 13:
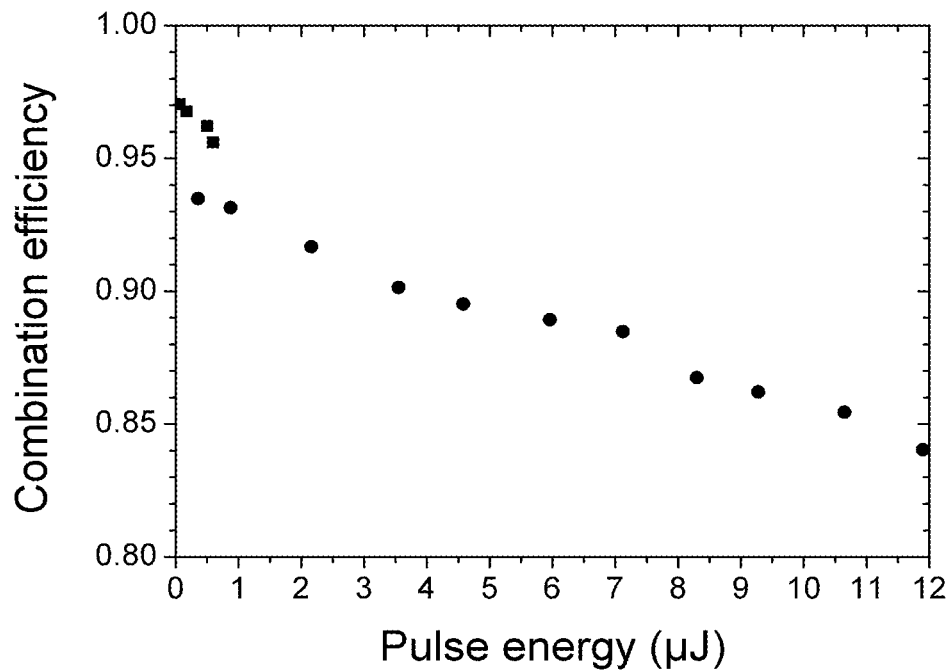
FIG. 13 shows a measurement of efficiency of the coherent combination of amplified pulses as a function of the pulse energy for a repetition frequency of 1 MHz and of 35 MHz.

FIG. 13 shows a measurement of the coherent combination efficiency as a function of the pulse energy for a repetition frequency of 1 MHz and of 35 MHz. A slow decrease of the combination efficiency as a function of the pulse energy is observed, despite a precise adjustment of the powers of the two pumps. This effect may notably come from the mutual reinjection between the two fibers, which are not perfectly symmetrical. The non-linear propagation is affected by this parameter because the relative spectral phase between the clockwise and counterclockwise optical paths has terms of higher orders that are not perfectly equilibrated.

Figure 14:
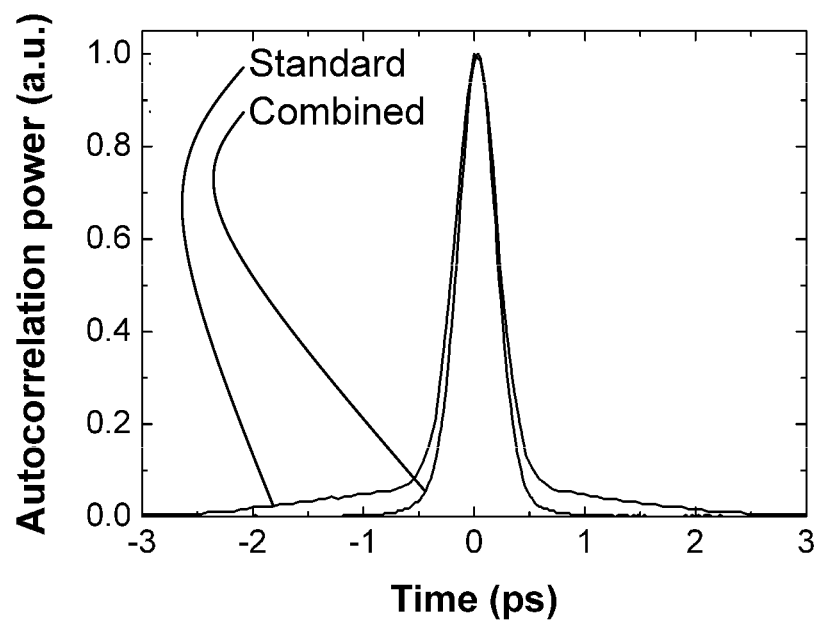
FIG. 14 shows an autocorrelation measurement for a conventional architecture with two amplification stages and for an architecture for the coherent recombination of two amplifiers according to the invention.

The amplification architecture of the device of the invention offers advantages compared to a standard two-stages amplification architecture by inserting an isolator in the interferometer. FIG. 14 shows a measurement of autocorrelation for an output power of 2 W at a repetition frequency of 1 MHz in the passive device for coherent combination of the invention and in a standard two-stages amplification device. The device of the invention allows fully suppressing the temporal distortions observed in the conventional configuration. The power fluctuations measured on the coherent combined beam are identical to the power fluctuations of each beam considered in isolation. This indicates that the phase noise plays a negligible role in the stability of the output power.

Figure 15:
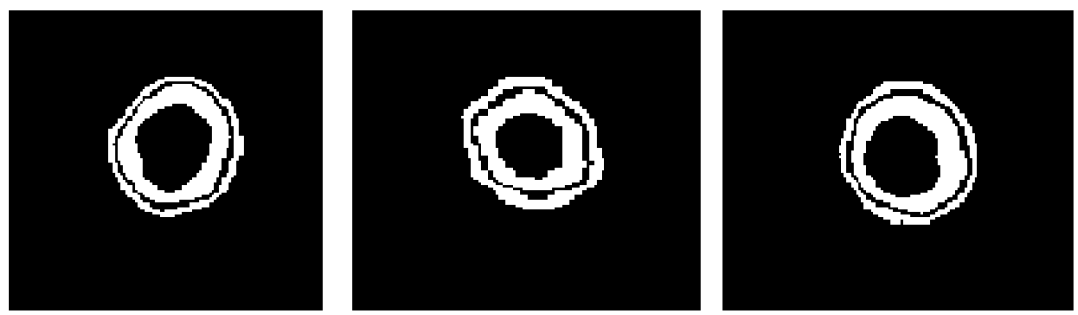
FIGS. 15A-15C show images of beam profiles and of beam quality measurement, respectively for a first amplified beam alone (9A), a second amplified beam alone (9B) and for a combined beam (9C)

FIG. 15 shows the beam profiles obtained and the values of the parameters $M^2$ measured. The parameter $M^2$ is a digital parameter used for assessing the spatial quality of a laser beam and the ideal value of which is equal to one. FIG. 15A shows the profile of the first amplified secondary beam ($H''_1$). FIG. 15B shows the profile of the second amplified secondary beam ($H''_2$). FIG. 15C shows the profile of the output coherent combined beam ($S_1$). The beam quality obtained is satisfying, provided a careful alignment and focusing of the interferometer. This alignment is crucial for obtaining a superimposition of the beams and a high combination efficiency.

The invention proposes an optical system for the passive coherent combination of two independent laser amplifiers. The principle of operation of the system is based on the amplitude division of the input signal into two secondary beams that are both amplified in the two amplifiers, in a reverse order, and at different instants of time, but until an energy level and an accumulated optical phase level allowing a high efficiency of coherent combination. At the output of the system, the two secondary beams reciprocally amplified are coherently recombined on the same optical component that has allowed the initial division. The output coherent amplified beam may be separated from the input signal by mean of an optical isolator.

The device of the invention has all the advantages of a passive system: the device is stable without requiring a complex electronic device for phase measurement and real-time negative feedback. Moreover, having now two amplifiers, the device allows doubling the optical power, the energy and the peak power with respect to a system with a single amplifier, with the use of conventional optical components. By way of comparison, in the prior art optical amplifiers devices with two amplification stages in series, the second amplification stage supports the maximum delivered peak power, which leads to negative non-linear effects for the second power amplifier. On the contrary, the device of the invention allows distributing the amplified power between the two amplifiers, which allows limiting more easily the accumulation of undesirable effects (thermal and non-linear effects in particular) in each amplifier. The total power is recombined outside the two amplifiers, via a passive system for coherent combination. The device of the invention allows obtaining a high recombination efficiency (up to 95% or event up to 100%), while preserving an excellent spatial quality of optical beam.

We will now describe in relation with FIGS. 16 to 18 a second application of the invention to a device and a method for spectral broadening comprising a system for coherent combination of two optical spectrum broadening devices, each optical spectrum broadening device being limited in power and/or in energy and/or in peak power.

FIG. 16 schematically shows a passive device for the coherent combination of two spectrally broadened optical beams according to a first variant of the third embodiment of the invention. The device of FIG. 16 comprises two hollow capillary optical fibers A1 and A2, also called hollow core capillary fibers. The hollow capillary optical fibers are used to spectrally stretch high energy and/or high power laser pulses. However, a capillary fiber is limited in energy, the maximum energy being of the order of 10 mJ for pulses of a few tens of fs. The device of FIG. 16 comprises two hollow capillary fibers A1 and A2 arranged in series on the optical path of a ring interferometer. Preferably, a polarization splitting cube 31 is used to split the incident beam $S_0$ into two linearly polarized secondary input beams $H_1$ and $H_2$. The broadening in a capillary fiber operating preferably in circular polarization, a quarter-wave plate 45, respectively 46, is placed between the splitting cube 31 and each capillary fiber A1, A2. The linearly s-polarized, first secondary beam $H_1$ passes through the first quarter-wave plate 45, and its polarization becomes circular. The circularly-polarized, first secondary beam undergoes a first spectral broadening by the first hollow capillary fiber A1, then a second spectral broadening by the second hollow capillary fiber A2. The doubly spectrally broadened and still circularly polarized first secondary beam passes through the second quarter-wave plate 46 and the first secondary output beam is then p-polarized. Reciprocally, the linearly p-polarized, second secondary beam $H_2$ passes through the second quarter-wave plate 46, and its polarization becomes circular. The circularly-polarized, second secondary beam undergoes a first spectral broadening by the second hollow capillary fiber A2, then a second spectral broadening by the first hollow capillary fiber A1. The doubly spectrally broadened and still circularly polarized second secondary beam passes through the first quarter-wave plate 45 and the second secondary output beam is then s-polarized. The splitting cube 31 then recombines the two secondary output beams, each having been twice spectrally broadened.

FIG. 17 schematically shows a passive device for the coherent combination of two spectrally broadened optical beams according to a second variant of the third embodiment of the invention. The device of FIG. 17 comprises two hollow capillary fibers A1 and A2 to spectrally broaden high energy and/or power laser pulses. In place of a polarization splitting cube, a thin-film polarizer 34 is used herein. Chirped mirrors M11, M12 and M13 are also used. The device of FIG. 17 allows eliminating the optical isolator, which has generally bad spectral phase properties. It can then be obtained at the output of the device of FIG. 17 a pulse of 20 femtoseconds, whose energy per pulse is higher than 20 mJ at a wavelength of 800 nm. The device of FIG. 16 or 17 may advantageously comprise a system of imagery (not shown), consisted for example of an optical system $2f$-$2f$ to form the image of the end of the first hollow capillary fiber A1 on the opposite end of the second hollow capillary fiber A2.

FIG. 18 schematically shows a device for the coherent combination of two spectrally broadened optical beams according to a third variant of the third embodiment of the invention. The device of FIG. 18 comprises two large mode optical fibers (large mode area fibers) (A1, A2) and applies more particularly to the spectral broadening of low-energy ultra-short laser pulses. The device of FIG. 18 comprises an optical isolator 23 that splits the input beam $S_0$ into two respectively s and p linearly polarized secondary beams. The large mode fibers are preferably silica single-mode fibers and operate in linear polarization. The device allows producing an output coherent recombined beam at a wavelength of 1030 nm, having pulses of 500 fs and whose energy per pulse is higher than 2 µJ.

The devices shown in FIGS. 16 to 18 illustrate the application to the spectral broadening of a laser beam, wherein the device allows distributing the energy and/or the power of the optical beam between two optical components arranged on the path of a ring interferometer, to form an output beam having an energy and/or a power higher than the maximum limit accepted by a single one of the two optical components.

The invention claimed is:

1. A passive device for the coherent combination of two amplified and/or spectrally broadened optical beams, comprising:
    an amplitude-division ring interferometer, said interferometer comprising:
        an optical beam splitter arranged so as to receive an incident optical beam and to spatially split it into a first secondary input beam and a second secondary input beam;
        optical components arranged so as to define a ring optical path in said interferometer, said first secondary input beam travelling through the ring interferometer in a clockwise direction to form a first secondary output beam and respectively said second secondary input beam travelling through the ring interferometer in a counterclockwise direction to form a second secondary output beam;
        at least one bidirectional optical component arranged on the optical path of said ring interferometer, said at least one bidirectional optical component being adapted to amplify and/or spectrally broaden on the one hand a secondary optical beam propagating in a clockwise direction and on the other hand a secondary optical beam propagating in a counterclockwise direction;

a reflective mirror or a Faraday mirror arranged on an output of the beam splitter so as to reflect the first secondary output beam and the second secondary output beam toward the ring interferometer, so that said first secondary beam and second secondary beam travel a second time through the ring interferometer and form a first secondary output optical beam amplified twice and/or spectrally broadened twice and a second secondary output optical beam amplified twice and/or spectrally broadened twice;

said beam splitter being arranged so as to receive and to spatially, temporally and coherently recombine said first secondary output beam amplified twice and/or spectrally broadened twice and said second secondary output beam, to form an amplified twice and/or spectrally broadened twice output coherent beam.

2. The passive device for coherent combination according to claim 1, further comprising an optical isolator arranged upstream of said ring interferometer so as to spatially split the incident optical beam and the amplified twice and/or spectrally broadened twice output coherent beam.

3. The passive device for coherent combination according to claim 1, wherein said optical components comprise highly reflective mirrors, chirped mirrors, optical fiber sections, and/or polarization maintaining optical fiber sections and/or specific dispersing optical fiber sections.

4. The passive device for coherent combination according to claim 1, wherein said beam splitter comprises a polarization beam splitter arranged so as to split the incident beam into a first secondary input beam and a second secondary input beam, said first and second secondary input beams being linearly polarized in orthogonal polarizations, said device further comprising at least a polarization rotator or a Faraday mirror arranged on the path of the ring interferometer, said polarization rotator or Faraday mirror being configured so that the first secondary output beam is linearly polarized with a same polarization as the second secondary input beam and so that the second secondary output beam is linearly polarized with a same polarization as the first secondary input beam.

5. The passive device for coherent combination according to claim 4, further comprising a half-wave plate, or two quarter-wave plates or two half-wave plates, or a Faraday rotator or a Faraday mirror, or a sub-unit comprising a polarization splitting cube, a quarter-wave plate and a reflective mirror.

6. The passive device for coherent combination according to claim 5, wherein said optical beam splitter comprises a polarizer and/or a wave plate and/or an optical isolator, configured so as to recombine in a same polarization state said first secondary output beam amplified twice and/or spectrally broadened twice and said second secondary output beam amplified twice and/or spectrally broadened twice orthogonally polarized relative to each other.

7. The passive device for coherent combination according to claim 1, wherein said at least one bidirectional optical component comprises an optical amplifier.

8. The passive device for coherent combination according to claim 1, wherein said at least one bidirectional optical component comprises a first bidirectional optical amplifier and a second bidirectional optical amplifier, said optical amplifiers being arranged in series on the optical path of the ring interferometer.

9. The passive device for coherent combination according to claim 8, wherein the first optical amplifier comprises a first optical fiber amplifier and said second optical amplifier comprises a second optical fiber amplifier.

10. The passive device for coherent combination according to claim 1, wherein said at least one bidirectional optical component comprises a first bidirectional optical component adapted to spectrally broaden said secondary optical beams and a second bidirectional optical component adapted to spectrally broaden said secondary optical beams.

11. A method for the passive coherent combination of two amplified and/or spectrally broadened optical beams, said method comprising the following steps:

coupling an incident optical beam to an amplitude-division ring interferometer, said interferometer comprising an optical beam splitter and at least one bidirectional optical component arranged on the optical path of said ring interferometer, said at least one optical component being adapted to amplify and/or spectrally broaden on the one hand a secondary optical beam propagating in a clockwise direction in the interferometer and on the other hand a secondary optical beam propagating in a counterclockwise direction in the interferometer;

spatially amplitude-splitting the incident optical beam by said optical beam splitter into a first secondary input beam and a second secondary input beam;

optically guiding said first secondary input beam ($H_1$) so that it travels through the ring interferometer in a clockwise direction and so that said first secondary input beam is amplified and/or spectrally broadened by said at least one optical component to form a first secondary output beam ($H''_1$) directed toward said beam splitter;

optically guiding said second secondary input beam so that it travels through the ring interferometer in a counterclockwise direction and so that said second secondary input beam is amplified and/or spectrally broadened by said at least one optical component to form a second secondary output beam directed toward said beam splitter;

reflecting the first secondary output beam and the second secondary output beam toward the ring interferometer, so that said first secondary beam and second secondary beam travel a second time through the ring interferometer and form a first secondary output optical beam amplified twice and/or spectrally broadened twice and a second secondary output optical beam amplified twice and/or spectrally broadened twice;

coherently spatially recombining the first secondary output beam amplified twice and/or spectrally broadened twice and the second secondary output beam by said optical beam splitter to form an amplified twice and/or spectrally broadened twice output coherent beam.

12. The method for coherent combination according to claim 11, wherein:

the spatial amplitude splitting of the incident optical beam into a first secondary input beam and a second secondary input beam comprises a polarization splitting, said first secondary input beam and second secondary input beam being polarized orthogonally, the optical guiding in the ring interferometer comprises a polarization rotation of 90 degrees, said first secondary output beam having the same polarization as the second secondary input beam and the second secondary output beam having the same polarization as the first secondary input beam, the coherent spatial recombination comprises a recombination of the first secondary output beam amplified twice and/or spectrally broadened twice and of the second secondary output beam amplified twice and/or spectrally broadened twice, the polarizations of the first secondary output beam and of the second secondary output beam amplified twice and/or spectrally broadened twice being orthogonal.

13. The passive device for coherent combination according to claim 2, wherein said optical components comprise highly reflective mirrors, chirped mirrors, optical fiber sections, and/or polarization maintaining optical fiber sections and/or specific dispersing optical fiber sections.

14. The passive device for coherent combination according to claim 2, wherein said beam splitter comprises a polarization splitter arranged so as to split the incident beam into a first secondary input beam and a second secondary input beam, said first and second secondary input beams being linearly polarized in orthogonal polarizations, said device further comprising a polarization rotator or a Faraday mirror arranged on the path of the ring interferometer, said polarization rotator or Faraday mirror being configured so that the first secondary output beam is linearly polarized with a same polarization as the second secondary input beam and so that the second secondary output beam is linearly polarized with a same polarization as the first secondary input beam (H1).

15. The passive device for coherent combination according to claim 3, wherein said beam splitter comprises a polarization splitter arranged so as to split the incident beam into a first secondary input beam and a second secondary input beam, said first and second secondary input beams being linearly polarized in orthogonal polarizations, said device further comprising a polarization rotator or a Faraday mirror arranged on the path of the ring interferometer, said polarization rotator or Faraday mirror being configured so that the first secondary output beam is linearly polarized with a same polarization as the second secondary input beam and so that the second secondary output beam is linearly polarized with a same polarization as the first secondary input beam.

16. The passive device for coherent combination according to claim 5, wherein said beam splitter comprises a polarizer and/or a wave plate and/or an optical isolator, configured so as to recombine in a same polarization state said first secondary output beam amplified twice and/or spectrally broadened twice and said second secondary output beam amplified twice and/or spectrally broadened twice orthogonally polarized relative to each other.

* * * * *